US008908923B2

(12) United States Patent
Billingham et al.

(10) Patent No.: US 8,908,923 B2
(45) Date of Patent: Dec. 9, 2014

(54) INTERIOR LOCATION IDENTIFICATION

(75) Inventors: James Billingham, Hants (GB); Helen Bowyer, Hampshire (GB); Kevin Brown, Hampshire (GB); Edward Jellard, Southampton (GB); Graham White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 13/107,072

(22) Filed: May 13, 2011

(65) Prior Publication Data
US 2012/0288202 A1 Nov. 15, 2012

(51) Int. Cl.
*G06K 9/00* (2006.01)
*G06K 9/62* (2006.01)

(52) U.S. Cl.
CPC .......... *G06K 9/6202* (2013.01); *G06K 9/00677* (2013.01)
USPC ........... 382/104; 382/100; 382/103; 382/153; 382/181; 348/113; 348/116; 701/1; 701/2; 701/28; 701/408; 701/409

(58) Field of Classification Search
USPC ......... 382/100, 103, 104, 153, 154, 181, 187, 382/209, 217, 218, 321, 325; 348/113, 116; 701/1, 2, 27, 28, 400, 408, 409, 450, 701/461, 519–524, 526
See application file for complete search history.

(56) References Cited

U.S. PATENT DOCUMENTS

| 6,292,106 | B1 | 9/2001 | Solinsky et al. |
| 7,184,586 | B2 * | 2/2007 | Jeon et al. ..................... 382/153 |
| 7,602,335 | B2 | 10/2009 | Pan |
| 7,765,027 | B2 * | 7/2010 | Hong et al. ..................... 701/23 |
| 7,774,158 | B2 * | 8/2010 | Domingues Goncalves et al. ............................. 701/28 |
| 8,024,072 | B2 * | 9/2011 | Park et al. ..................... 700/259 |
| 8,498,488 | B2 * | 7/2013 | Yoon et al. ..................... 382/181 |
| 2001/0032070 | A1 | 10/2001 | Teicher |
| 2004/0239756 | A1 * | 12/2004 | Aliaga et al. ..................... 348/36 |
| 2007/0140595 | A1 | 6/2007 | Taylor et al. |
| 2010/0008337 | A1 | 1/2010 | Bajko |
| 2010/0074471 | A1 | 3/2010 | Kurzweil et al. |
| 2010/0121567 | A1 | 5/2010 | Mendelson |
| 2010/0161225 | A1 * | 6/2010 | Hyung et al. ................. 345/420 |
| 2010/0250126 | A1 * | 9/2010 | Epshtein et al. .............. 701/209 |

OTHER PUBLICATIONS

D. P. Prasser, G. F. Wyeth and M. J. Milford, "Biologically Inspired Visual Landmark Processing for Simultaneous Localization and Mapping", IEEE, Proceedings of 2004 IEEE/RSJ International Conference on Intelligent Robots and Systems, vol. 1, Oct. 2004, pp. 730-735.*

(Continued)

Primary Examiner — Eric Rush
(74) Attorney, Agent, or Firm — Kunzler Law Group

(57) ABSTRACT

A parse module calibrates an interior space by parsing objects and words out of an image of the scene and comparing each parsed object with a plurality of stored objects. The parse module further selects a parsed object that is differentiated from the stored objects as the first object and stores the first object with a location description. A search module can detect the same objects from the scene and use them to determine the location of the scene.

12 Claims, 5 Drawing Sheets

(56) References Cited

OTHER PUBLICATIONS

Martin Azizyan, Ionut Constandache and Romit Roy Choudhury, "SurroundSense: Mobile Phone Localization via Ambience Fingerprinting", ACM, Proceedings of the 15th Annual International Conference on Mobile Computing and Networking, Sep. 2009, pp. 261-272.*

Rimon Elias and Amal Elnahas, "An Accurate Indoor Localization Technique Using Image Matching", IEEE, 3rd IET International Conference on Intelligent Environments, Sep. 2007, pp. 376-382.*

Masahiro Tomono and Shin'ichi Yuta, "Object-based Localization and Mapping using Loop Constraints and Geometric Prior Knowledge", IEEE, International Conference on Robotics and Automation, vol. 1, Sep. 2003, pp. 862-867.*

Viswanathan, P.; Meger, D.; Southey, T.; Little, J.J.; Mackworth, A. "Automated Spatial-Semantic Modeling with Applications to Place Labeling and Informed Search", Canadian Conference on Computer and Robot Vision, pp. 284-291, May 2009.*

Hayet, J.B.; Lerasle, F.; Devy, M., "Visual landmarks detection and recognition for mobile robot navigation," IEEE Computer Society Conference on Computer Vision and Pattern Recognition, vol. 2, pp. II-313-II-318, Jun. 2003.*

Viswanathan, P; Southey, T.; Little, J.; Mackworth, A. "Automated Place Classification Using Object Detection", Canadian Conference on Computer and Robot Vision (CRV), pp. 324-330, Jun. 2010.*

Chieh-Chih Wang and Chuck Thorpe, "Simultaneous Localization and Mapping with Detection and Tracking of Moving Objects", IEEE, Proceedings of the 2002 IEEE International Conference on Robotics and Automation, May 2002, pp. 2918-2924.*

Chieh-Chih Wang, Charles Thorpe and Sebastian Thrun, "Online Simultaneous Localization and Mapping with Detection and Tracking of Moving Objects: Theory and Results from a Ground Vehicle in Crowded Urban Areas", IEEE, Proceedings of the 2003 IEEE International Conference on Robotics and Automation, vol. 1, Sep. 2003, pp. 842-849.*

Muhammad Tahir Qadri et al., Automatic No. Plate Recognition System for Vehicle Identification Using Optical Character Recognition, International Conference on Education and Technology and Computer, Singapre, Apr. 17-20 2009.

Michael Peter et al., Indoor Navigation and Modeling Using Photographed Evacuation Plans and Mems Imu, Nov. 15-19, 2010, Orlando, FL.

Holger Linde, On Aspects of Indoor Localization, Dissertation, Aug. 2006.

Eleni Trouva, The Mobile Phone as a Platform for Assisting the Independent Living of Aging People, Athens, Jun. 2009.

Jose M. Alonso et al., Towards People Indoor Localization Combining Wifi and Human Motion Recognition, Feb. 3-5, 2010.

Chieh-Chih Wang and Chuck Thorpe, "Simultaneous Localization and Mapping with Detection and Tracking of Moving Objects", IEEE, Proceedings of the 2002 IEEE International Conference on Robotics & automation, vol. 3, May 2002, pp. 2918-2924.

* cited by examiner

INTERIOR LOCATION IDENTIFICATION

FIELD

The subject matter disclosed herein relates to location identification and more particularly relates to interior location identification.

BACKGROUND

Description of the Related Art

Global Positioning System (GPS) devices are frequently used to determine a position and/or support navigation in exterior spaces. However, GPS signals often cannot be received in interior spaces such as inside of a building. As a result, a user may be unable to determine a location, use a navigation program, or use other location dependent functions of an electronic device.

BRIEF SUMMARY

From the foregoing discussion, it should be apparent that a need exists for a method and apparatus that identifies interior locations. Beneficially, such a method and apparatus would determine a location within an interior location such as a building or subway station.

The present invention has been developed in response to the present state of the art, and in particular, in response to the problems and needs in the art that have not yet been fully solved by currently available interior location identification methods. Accordingly, the present invention has been developed to provide a method for identifying interior locations that overcome many or all of the above-discussed shortcomings in the art.

A method of the present invention is presented for interior location identification. The method parses at least one object from a first image of an interior space and compares each parsed object with a plurality of stored objects. The method further selects a parsed object that is differentiated from the stored objects as the first object and indexes a location description of the interior space with the first object in a location record.

The apparatus for interior location identification is provided with a plurality of modules configured to functionally execute the method. These modules in the described embodiments include a computer readable storage medium and a parse module.

The computer readable storage medium stores computer readable program code executable by a processor. The parse module parses at least one object from a first image of an interior space and compares each parsed object with a plurality of stored objects. The parse module further selects a parsed object that is differentiated from the stored objects as the first object and indexes a location description of the interior space with the first object in a location record.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
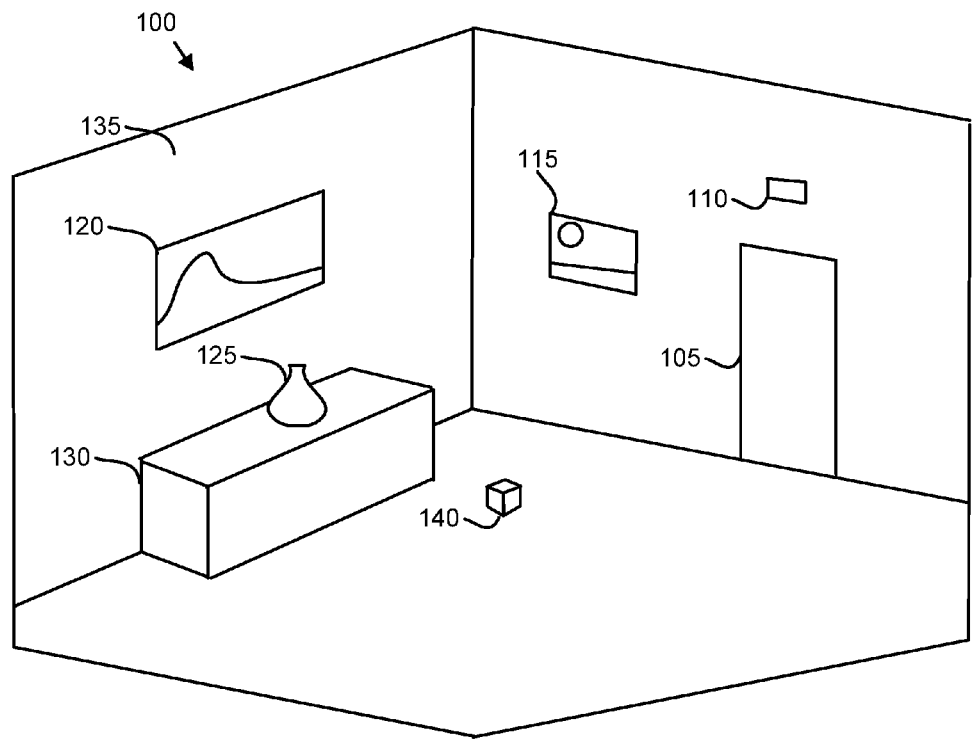
FIG. 1 is a perspective drawing illustrating one embodiment of an interior space.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the computer program product, the payment owed to the service provider is reconciled to the payment owed by the service provider to minimize the transfer of payments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a perspective drawing illustrating one embodiment of an interior space 100. The interior space 100 may be a room in a building. The interior space 100 is exemplary of the other interior spaces, including the interior of a shopping area, a transportation facility, an entertainment venue, a restaurant, an apartment or flat, a home, and the like. For simplicity the interior space 100 is described herein as being within a building.

The depicted interior space 100 includes a door 105, a signal box 110, one or more illustrations 115, 120, a credenza a 130, a vase 125, and a wall 135. In one embodiment, a camera 140 records a first image of the interior space 100. The camera 140 may be a digital still camera, a digital video camera, or the like. The camera 140 may be embodied in a device such as a cellular telephone, a tablet, a notebook computer, or the like. In one embodiment, the first image comprises a plurality of images. The plurality of images may be digitally combined into a single image. Images may be a Motion Picture Experts Group (MPEG)-1 file, an MPEG-2 file, an MPEG-3 file, an MPEG-4 file, an MPEG-7 file, an MPEG-21 file, Portable Network Graphics (PNG) file, a Joint Photographic Experts Group (JPEG) file, a Graphics Interchange Format (GIF) file, or the like.

Figure 2:
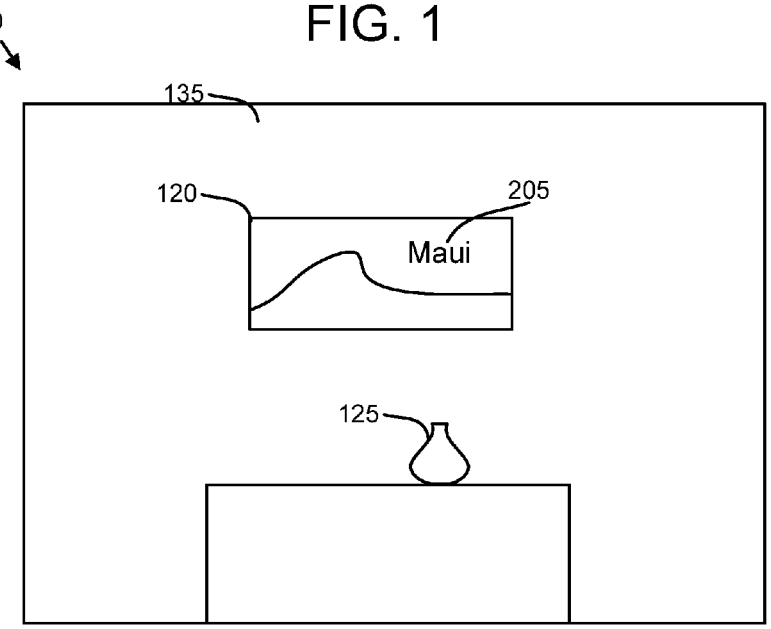
FIG. 2 is a drawing illustrating one embodiment of an image.

FIG. 2 is a front view drawing illustrating one embodiment of an image 200. The image 200 may be the first image captured by the camera 140 as described in FIG. 1. In an alternate embodiment, the image 200 may be a second image that is subsequently captured as will be described hereafter. The description of the image 200 refers to elements of FIG. 1, like numbers referring to like elements. The image 200 includes the illustration 120, the vase 125, the credenza 130, and the wall 135. In the depicted embodiment, the illustration 120 includes text 205.

In one embodiment, the one or more objects are parsed from the image 200. For example, illustration 120, the text 205, the vase 125, the credenza 130, and the wall 135 may each be parsed as an object as will be described hereafter.

Figure 3:
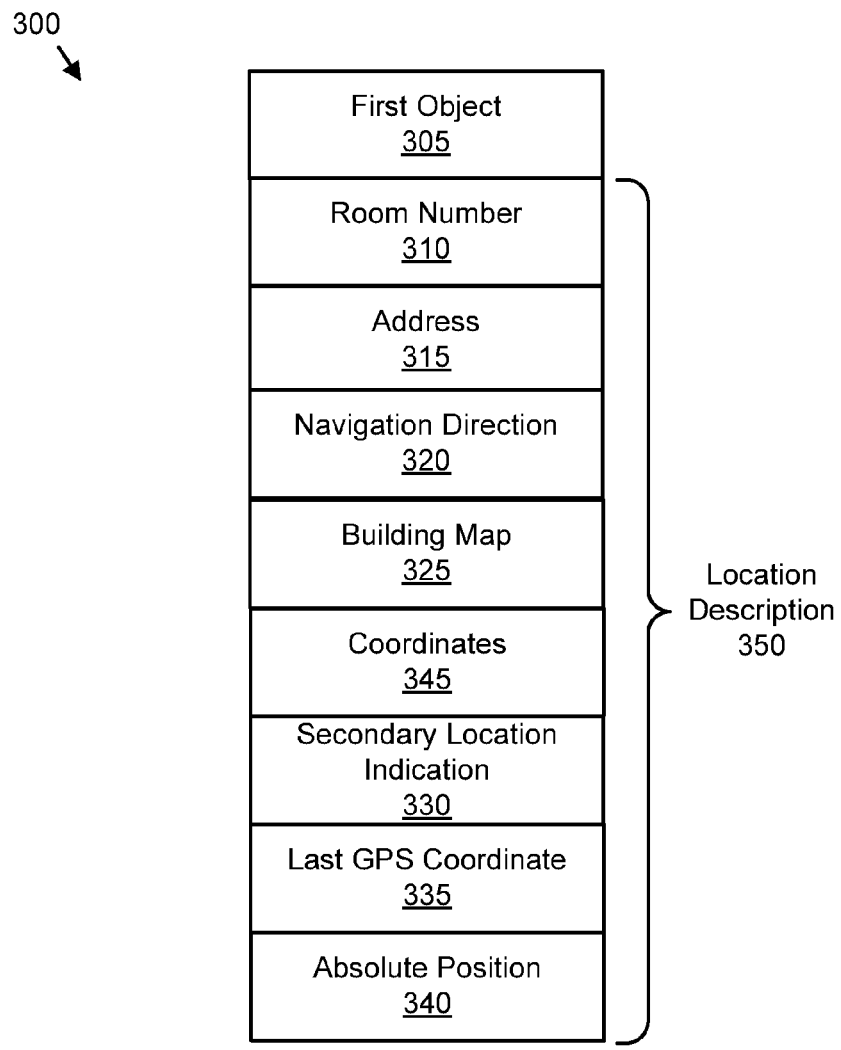
FIG. 3 is a schematic block diagram illustrating one embodiment of a location record.

FIG. 3 is a schematic block diagram illustrating one embodiment of a location record 300. The location record 300 may store an object parsed from the image 200 of FIG. 2 as a first object 305. The description of the location record 300 refers to elements of FIGS. 1-2, like numbers referring to like elements. The location record 300 includes the first object 305, a room number 310, an address 315, a navigation direction 320, a building map 325, coordinates 345, a secondary location indication 330, a last GPS coordinate 335, and an absolute position 340. The object 305, room number 310, address 315, navigation direction 320, building map 325, coordinates 345, secondary location indication 330, last GPS coordinate 335, and absolute position 340 may be stored in data structures of the location record 300.

The first object 305 may include one or more files storing one or more first objects 305. In addition, the first object 305 may store one or more parsed characteristics of the first object 305. The parsed characteristics may include but are not limited to color, shape, hue, a hash of an image, the Fourier transform of an image, vectors for one or more lines, and reflectivity values. The parsed characteristics may also include a spatial relationship between a plurality first objects 305. For example, the spatial relationship may include a three-dimensional position of each first object 305. Alternatively, the spatial relationship may include a two-dimensional position of each first object 305 on the image 200.

The room number 310, address 315, navigation direction 320, building map 325, coordinates 345, secondary location indication 330, last GPS coordinate 335, and absolute position 340 may be embodied in a location description 350. The room number 310 may include a room number, a room description. The coordinates 345 may comprise two or more coordinates for a building map, coordinates within a building model, coordinates within a site grid, global coordinates, and the like.

The address 315 may include a street address for the interior space 100. The navigation direction 320 may include one or more directions to the interior space 100 from one or more entrances of the building. The building map 325 may store the building map. The building map 325 may be a two-dimensional map of the building, one or more two-dimensional maps of each floor of the building, a three-dimensional model of the building, or the like. In one embodiment, the room coordinate stored in the room number 310 refers to a location on the building map 325. The coordinates 345 may indicate a position on the building map 325.

The secondary location indication 330 may be a least one of a wireless network identification, a cellular network identification, an infrared navigation beacon. The wireless network identification may be an identification for a WiFi network, a Bluetooth network, or the like. For example, the signal box 110 may be a transceiver for the WiFi network and/or the Bluetooth network. The wireless network may also be a plurality of broadcast stations including radio stations, television stations, and the like, a WiFi network, a Bluetooth network, communications in a specified radio frequency band, and the like.

The cellular telephone network identification may include an identification from one or more base transceiver identifications, one or more signal strengths, and/or one or more signal directions. The infrared navigation beacon may be an infrared signal broadcast by the signal box 110.

The last GPS coordinate 335 may be a GPS coordinate recorded before a GPS signal is lost within the building. For example, the last GPS coordinate may be a position recorded by a cellular telephone that is carried in to the building prior to losing GPS signals. The absolute position 340 may be a coordinate, a street address, or the like. The absolute position 340 may be added to the location record 300 subsequent to creation of the location record 300.

The location record 300 is indexed using the first object 305 so that the location description 350 may be retrieved by identifying the first object 305. The room number 310, address 315, navigation direction 320, building map 325, coordinates 345, secondary location indication 330, last GPS coordinate 335, and absolute position 340 may also be searchable, allowing the location record 300 to be identified using any data stored therein.

Figure 4:
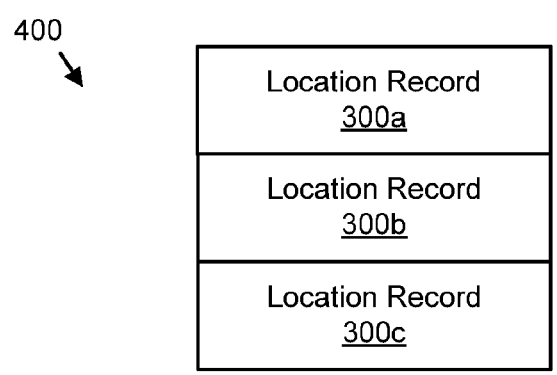
FIG. 4 is a schematic block diagram illustrating one embodiment of a data store.

FIG. 4 is a schematic block diagram illustrating one embodiment of a data store 400. The data store 400 may store a plurality of the location records 300 described in FIG. 3. The data store 400 may be stored on a computer readable medium such as a computer readable storage medium.

Figure 5:
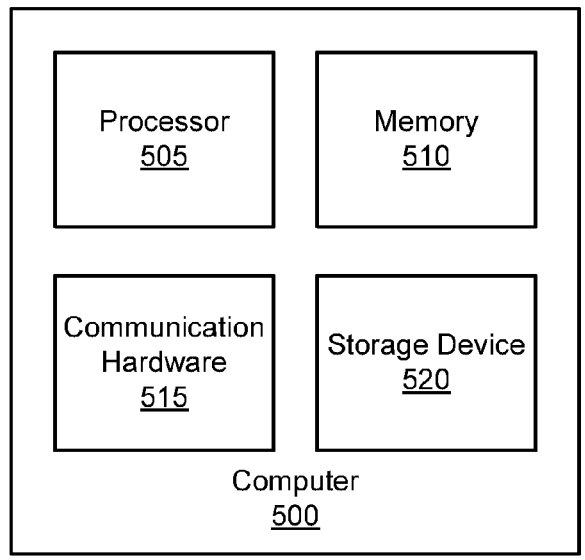
FIG. 5 is a schematic block diagram illustrating one embodiment of a computer.

FIG. 5 is a schematic block diagram illustrating one embodiment of a computer 500. The computer 500 may store and process the data store 400 of FIG. 4. The computer 500 includes a processor 505, a memory 510, communication hardware 515, and a storage device 520.

The memory 510 may store computer readable program code. The processor 505 may execute the computer readable program code. The computer 500 may communicate through the communication hardware 515. The storage device 520 may also store the computer readable program code.

Figure 6:
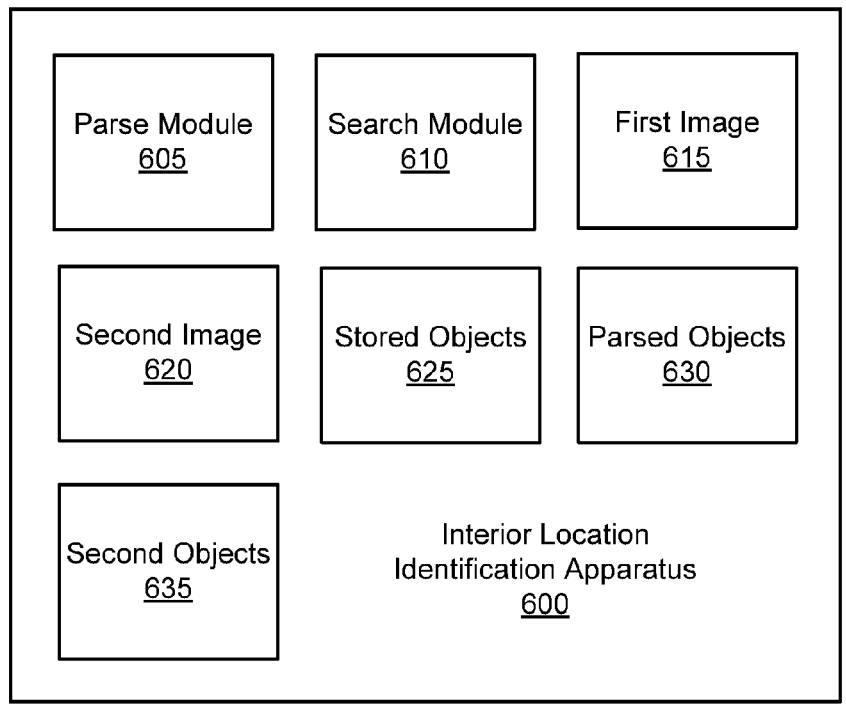
FIG. 6 is a schematic block diagram illustrating one embodiment of an interior location identification apparatus.

FIG. 6 is a schematic block diagram illustrating one embodiment of an interior location identification apparatus 600. The apparatus 600 may perform functions of interior location identification. The description of the apparatus 600 refers to elements of FIGS. 1-5, like numbers referring to like elements. The apparatus 600 includes a parse module 605, a search module 610, the first image 615, the second image 620, stored objects 625, parsed objects 630, and second objects 635. The parse module 605, search module 610, first image 615, second image 620, stored objects 625, parsed objects 630, and second objects 635 may be embodied in computer readable program code stored in the memory 510 and/or the storage device 520 and executed by the processor 505. In one embodiment, the parse module 605 and the search module 610 are embodied in separate computers 500. Alternatively, the parse module 605 and the search module 610 may be embodied in a single computer 500.

The parse module 605 parses at least one object 630 from the first image 615 of the interior space 100. In addition, the parse module compares each parsed object 630 with a plurality of stored objects 625. The stored objects 625 may the first objects 305 stored in the data store 400. Alternatively, the stored objects 625 may be stored in a separate data structure.

The parse module 605 selects a parsed object 630 that is differentiated from the stored objects 625 as the first object 305. In addition, the parse module 605 indexes a location description 350 of the interior space 100 with the first object 305 in a location record 300.

The search module 610 identifies the first object 305 from a second image 620 of the interior space 100. The second image 620 may be the image 200. The search module 610 retrieves the location description 350 from the data store 400 in response to identifying the first object 305.

Figure 7:
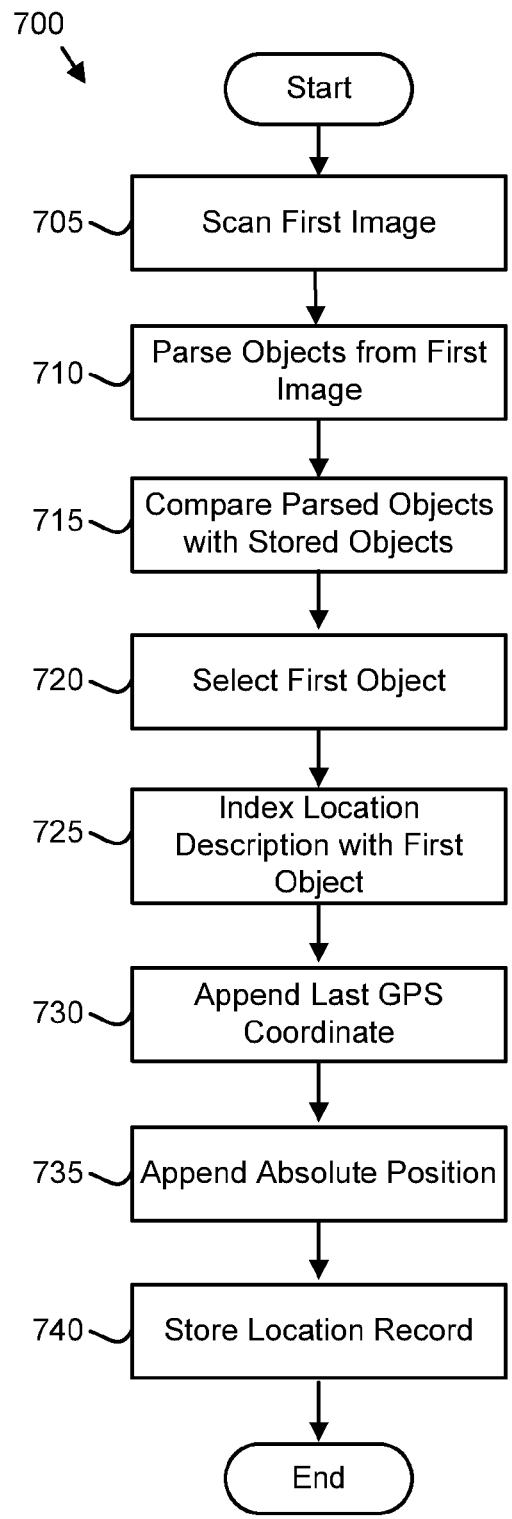
FIG. 7 is a schematic flow chart diagram illustrating one embodiment of an interior location storage method.

FIG. 7 is a schematic flow chart diagram illustrating one embodiment of an interior location storage method 700. The method 700 may perform functions of the interior location identification apparatus 600 of FIG. 6. The description of the method 700 refers to elements of FIGS. 1-6, like numbers referring to like elements.

The method 700 starts, and in one embodiment the camera 140 scans 705 the first image 615. The camera 140 may scan 705 the first image 615 as part of a systematic cataloging of images and location descriptions for the building. Alternatively, the camera 140 may scan 705 the first image 615 as part of a voluntary submission of information regarding the interior space 100. For example, an occupant of the interior space 100 may submit the first image 615 to identify the location of the interior space 100.

The parse module 605 may parse 710 one or more objects 630 from the first image 615 of the interior space 100. In one embodiment, the parse module 605 employs a pattern recognition algorithm to parse 710 the objects 630. The parse module 605 may identify boundaries for a parsed object 630, remove background pixels from the parsed object 630, and record the parsed object 630 as a distinct data file.

The parse module 605 may determine characteristics of the parsed object 630. For example, the parse module 605 may perform a hash algorithm to generate a hash of the parsed object 630. Alternatively, the parse module 605 may perform a Fourier transform on the parsed object 630 to generate a transform of the parsed object 630. In addition, the parse module 605 may determine other characteristics of the parsed object 630 including but not limited to one or more colors, one or more average colors, one or more shapes, one or more tones, one or more hues, vectors for one or more lines, and one or more reflectivity values for the parsed object 630.

In one embodiment, the parse module 605 compares 715 the parsed objects 630 from the first image 615 with one or more stored objects 625. The stored objects 625 may be first objects 305 stored in location records 300 of the data store 400. Alternatively, the stored objects 625 may be embodied in a database of common objects. For example, a computer monitor object may be included in the stored objects 630 and classified as a common object that is less likely to provide location clues. Other stored objects may be identified as likely to provide location clues.

The parse module 605 may compare 715 characteristics of the parsed object 630 with characteristics of the stored objects 625. The parse module 605 may calculate a plurality of characteristic scores from the characteristics of each parsed object 630. The parse module 605 may further compare 715 the parsed object characteristic scores with characteristic scores of the stored objects 625.

The parse module 605 may calculate a similarity score for each characteristic as a difference between the characteristic of a parsed object 630 and the same characteristic of a stored object 625. In addition, the parse module 605 may calculate a characteristic difference score as a sum of products of similarity scores and weights. Equation 1 illustrates one embodiment of calculating the characteristic difference score C where each $k_i$ is a weight that is greater than zero and $s_i$ is a similarity score.

$$C = \Sigma k_i * s_i \quad \text{Equation 1}$$

In an alternate embodiment, the parse module 605 compares 715 the parsed objects 630 with the stored objects 625 based on the spatial relationships between the parsed objects 630 and the stored objects 625. For example, the spatial relationship of three computer monitors in a first object 305 may uniquely identify a location of the interior space 100 although the computer monitors are not individually unique. To determine if a spatial relationship may identify the interior space 100, the parse module 605 may co-locate a first parsed object 630 and a first stored object 625 within a spatial system. The parse module 605 may further calculate a spatial difference score as a sum of differences between each other parsed object 630 and corresponding stored objects 625 that are spatially related to the first stored object 625.

In one embodiment, the parse module 605 excludes from consideration parsed objects that are identified as mobile. For example, the parse module 605 may identify a parsed object 630 as a purse by comparing the parsed object with a plurality of purse stored objects 625. The parse module 605 may exclude the purse parsed object 630.

In one embodiment, the parse module 605 selects 720 one or more parsed objects 630 as the first object 305. The parse module 605 may select 720 parsed objects 630 that are most differentiated from the stored objects 625. For example, the parse module 605 may select 720 parsed object with a lowest characteristic difference score, a lowest spatial difference score, and/or combinations thereof.

The parse module 605 further indexes 725 the location description 350 for the interior space 100 with the selected first object 305 to form the location record 300. In one embodiment, the location description 350 may be recorded in the location record 300 by an automated device, from an entry, or combinations thereof. Thus the location description 350 may be retrieved for identifying the location of the interior space 100 as will be described hereafter.

In one embodiment, the parse module 605 appends 730 the last GPS coordinate 335 to the location record 300. The last GPS coordinate 335 may be a most recent GPS coordinate recorded by a device such as the camera 140. The last GPS coordinate 335 may not accurately indicate the location of the interior space 100. However, the last GPS coordinate 335 may be near to the interior space 100.

The parse module 605 may further append 735 the absolute position 740 to the location record 300. The absolute position 740 may be entered at a later date. In addition, the parse module 605 may store 740 the location record 300 in the data store 400 and the method 700 ends.

The method 700 scans 705, parses 710, and selects 720 first objects 305 that may subsequently be used to recover the location record 300 and the location information 350 for identifying the interior space 100.

Figure 8:
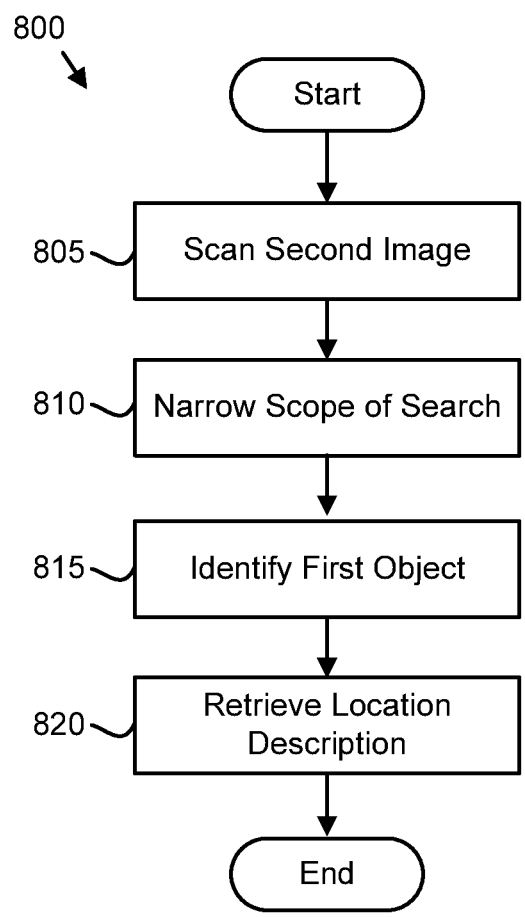
FIG. 8 is a schematic flow chart diagram illustrating one embodiment of an interior location identification method.

FIG. 8 is a schematic flow chart diagram illustrating one embodiment of an interior location identification method 800. The method 800 may perform functions of the interior location identification apparatus 600 of FIG. 6. The description of the method 800 refers to elements of FIGS. 1-7, like numbers referring to like elements.

The method 800 starts, and in one embodiment, the camera 140 scans 805 the second image 620 from the interior space 100. In a certain embodiment, the second image 620 comprises a plurality of images 200. The plurality of images 200 may be digitally combined into a single image. Images may be a Motion Picture Experts Group (MPEG)-1 file, an MPEG-2 file, an MPEG-3 file, an MPEG-4 file, an MPEG-7 file, an MPEG-21 file, Portable Network Graphics (PNG) file, a Joint Photographic Experts Group (JPEG) file, a Graphics Interchange Format (GIF) file, or the like.

The camera 140 may be embodied in device such as a cellular telephone, a tablet computer, a notebook computer, portable electronic device, or the like. The camera 140 may scan 805 the second image 620 to identify the location of the interior space 100.

In one embodiment, the search module 610 narrows 810 a scope of the search. The search module 610 may narrow 810 the scope of the search to location records 300 with last GPS coordinates 335 and/or absolute positions 340 within a specified radius of a last GPS coordinate measured by the device. The specified radius may be in the range of 25 to 200 meters. For example, the device may record a current last GPS coordinate. The search module 610 may only consider location records 300 wherein the last GPS coordinate 335 and/or the absolute position 340 is within 100 meters of the current last GPS coordinates.

In one embodiment, the search module determines an estimated location by triangulating one or more signals including but not limited to cellular telephone signals, broadcast signals, and/or wireless network signals. The search module 610 may narrow the search by only considering location records 300 wherein the last GPS coordinate 335 and/or the absolute positioned 340 is within 100 meters of the estimated location.

Alternatively, the search module 610 may narrow 810 the scope of the search to location records 300 with secondary location indications 330 that match a secondary location indication 330 that is identified that the current location. For example, if the search module 610 detects a WiFi network named "plazaonenet," the search module 610 may narrow 810 the scope of the search to location records 300 with a least one secondary location indication 330 comprising a WiFi network named "plazaonenet."

The search module 610 identifies 815 the first object 305 of a location record 300 from the second image 615. In one embodiment, the search module 610 employs a pattern recognition algorithm to parse second objects 635 from the second image. The parse module 605 may identify boundaries for a second object 635, remove background pixels from the second object 635, and record the second object 635 as a distinct data file.

The search module 610 may determine characteristics of the second object 635. For example, the search module 610 may perform a hash algorithm to generate a hash of the second object 635. Alternatively, the search module 610 may perform a Fourier transform on the second object 635 to generate a transform of the second object 635. In addition, the search module 610 may determine other characteristics of the second object 635 including but not limited to one or more colors, one or more average colors, one or more hues, one or more shapes, vectors for one or more lines, one or more tones values, and one or more reflectivity values.

The search module 610 may calculate a plurality of characteristic scores from the characteristics of each parsed second object 635. The search module 610 may further compare the parsed second object characteristic scores with characteristic scores of the first objects 305. In one embodiment, the search module 610 calculates with a characteristic difference score, a lowest spatial difference score, and/or combinations thereof for each parsed second object 635 and each first object 305 and identifies 815 the first object 305 from the data store 400 with the smallest differences in characteristic difference scores and/or spatial difference scores. In an alternate embodiment, the search module 610 identifies 815 a plurality of first objects 305 that each exceeds a match threshold.

In one embodiment, the search module 610 retrieves 820 a location description 350 from the location record 300 of the identified first object 305 and the method 800 ends. The search module 610 may also retrieve 820 a plurality location descriptions 350 for first objects 305 that exceed the match threshold. The search module 610 may present the location description 350 on a display, provide an audible rendering, communicate the location description to another device, or the like. Thus a device employing an embodiment is enabled to identify the location of the interior space 100 even if no GPS signal is available.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for task context recovery, the computer program product comprising:
a tangible computer readable storage medium having computer readable program code executable by a processor embodied therein, the computer readable program code configured to:
parse at least one object from a first image of an interior space;
compare each parsed object with a plurality of stored objects;
select parsed objects as first objects by excluding parsed objects that are identified as potentially mobile, calculating a plurality of spatial difference scores for each of at least two parsed objects that corresponds to a same stored object as a sum of differences between each of the at least two parsed objects, and selecting the at least two parsed objects with a lowest spatial difference score as the first objects; and
index a location description of the interior space with the first objects in a location record.

2. The computer program product of claim 1, the computer readable program code further configured to:
scan the first image; and
append a secondary location indication to the location record.

3. The computer program product of claim 2, wherein the secondary location indication is selected from the group consisting of a wireless network identification and a cellular telephone network identification.

4. The computer program product of claim 1, the computer readable program code further configured to:
identify the first objects from a second image of the interior space; and
retrieve the location description in response to identifying the first objects.

5. The computer program product of claim 1, the computer readable program code further configured to:
scan a second image; and
narrow a scope for identifying the first objects using a secondary location indication.

6. The computer program product of claim 1, wherein the first object comprises text and an Optical Character Recognition (OCR) process parses the text.

7. The computer program product of claim 1, wherein the location description comprises at least one of a room number, an address, a navigation direction, a building map, and coordinates.

8. An apparatus comprising:
a tangible computer readable storage medium storing computer readable program code executable by a processor, the computer readable program code comprising:
a parse module parsing at least one object from a first image of an interior space, comparing each parsed object with a plurality of stored objects, selecting parsed objects as first objects by excluding parsed objects that are identified as potentially mobile, calculating a plurality of spatial difference scores for each of at least two parsed objects that corresponds to a same stored object as a sum of differences between each of the at least two parsed objects, selecting the at least two parsed objects with a lowest spatial difference score as the first objects, and indexing a location description of the interior space with the first objects in a location record.

9. The apparatus of claim 8, the parse module further scanning the first image and appending a secondary location indication to the location record.

10. The apparatus of claim 9, wherein the secondary location indication is selected from the group consisting of a wireless network identification and a cellular telephone network identification.

11. The apparatus of claim 8, the apparatus further comprising a search module identifying the first objects from a second image of the interior space and retrieving the location description in response to identifying the first objects.

12. The apparatus of claim 11, the search module further scanning the second image and narrowing a scope for identifying the first objects using a secondary location indication.

* * * * *